(Model.)
A. SEWEL.
ANIMAL TRAP.
No. 363,554. Patented May 24, 1887.
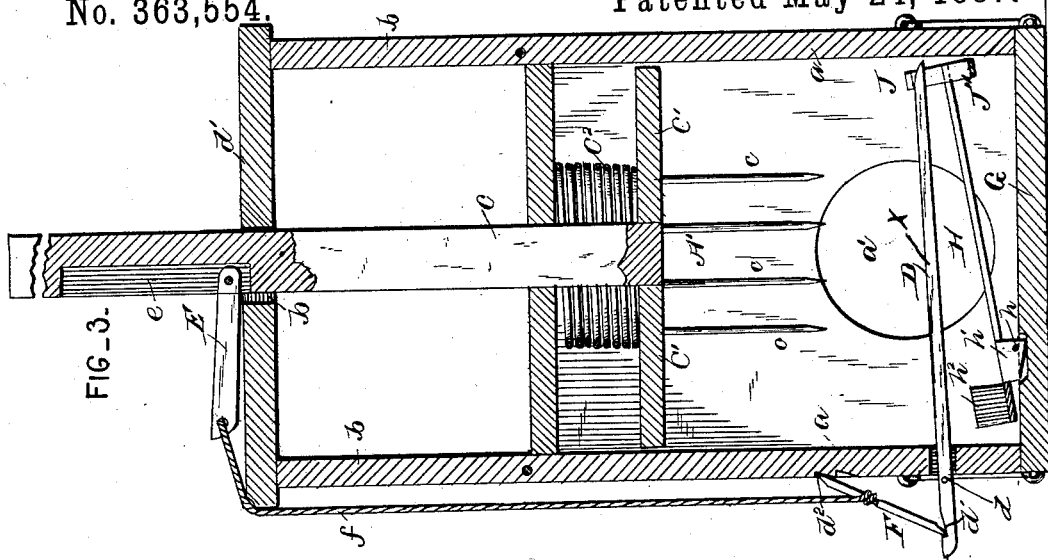
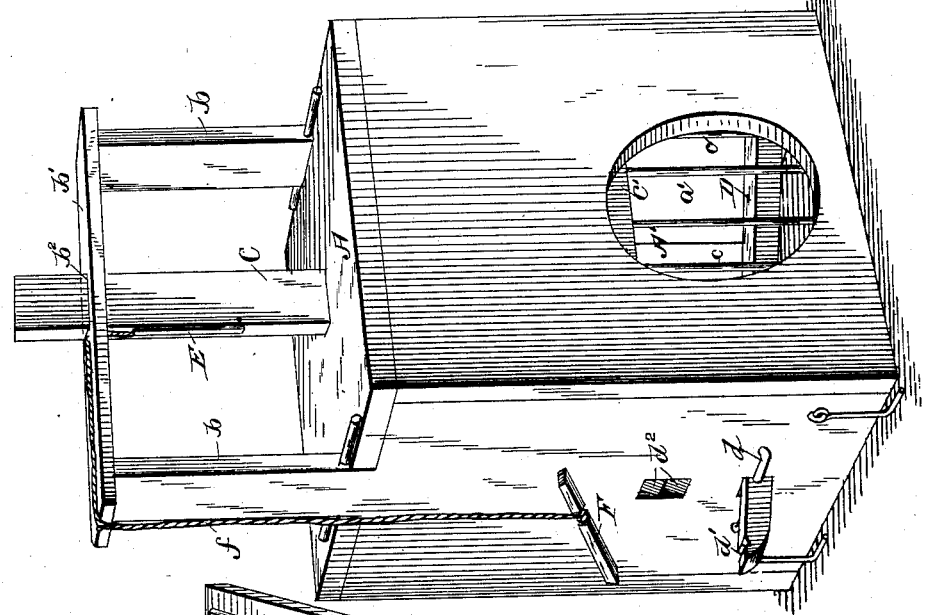
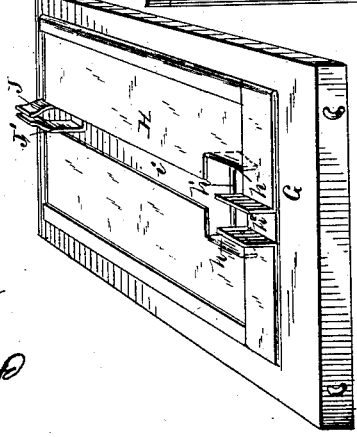
WITNESSES:
W. T. Gill.
INVENTOR
Alworth Sewel
BY
ATTORNEYS

UNITED STATES PATENT OFFICE.

ALWORTH SEWEL, OF BERRYVILLE, ARKANSAS.

ANIMAL-TRAP.

SPECIFICATION forming part of Letters Patent No. 363,554, dated May 24, 1887.

Application filed April 14, 1886. Serial No. 198,853. (Model.)

*To all whom it may concern:*

Be it known that I, ALWORTH SEWEL, a citizen of the United States, residing at Berryville, in the county of Carroll and State of Arkansas, have invented new and useful Improvements in Mole or Rat Traps, of which the following is a specification, reference being had to the accompanying drawings My invention relates to improvements in convertible mole or rat traps; and it consists of the peculiar and novel construction and combination of parts, substantially as hereinafter fully set forth, and specifically pointed out in the specification and claims.

The primary object of my invention is to provide an improved device which can be used either as a mole or as a rat trap, a few simple and quickly-performed changes in the construction of the device being only necessary to convert the device from a complete mole-trap into a complete rat-trap, and vice versa.

A further object of my invention is to provide a trap which shall be simple, strong, and durable in construction, thoroughly effective for the purposes designed, easy and ready of adjustment, and cheap.

In the accompanying drawings, Figure 1 is a perspective view of my invention adjusted for use as a mole-trap. Fig. 2 is a similar view of the base or attachment for converting the device into a rat-trap; and Fig. 3 is a vertical sectional view through the trap with the base connected thereto and adapted for use as a rat trap.

Referring to the drawings, in which like letters of reference indicate corresponding parts in all the figures, A designates the case of my improved convertible mole or rat trap, which comprises the inclosing-walls $a$, which are provided near their lower ends with proper openings, $a'$, for the admission of the animal to the chamber $A'$ thereof. The case A is provided with an open lower end and a closed upper end, and the upper end is further provided with vertical standards or uprights $b$, which are connected by a cross-bar, $b'$, having an opening, $b^2$, therein, through which a vertically-movable shaft or plunger, C, works. This shaft extends through the closed upper end of the case A, and at its lower end it carries a follower or plate, C', which is of a size and shape corresponding to the shape of the case A in cross-section. This follower or plate is provided with teeth or spears $c$, which are arranged thereon at the sides where the entrance holes or openings $a'$ are provided in the case A, so that when the follower C' is forced down the spears or teeth either impale the animal or close the openings $a'$, so as to prevent its escape therethrough. A spring, $C^2$, normally holds the follower and its spears downward, and this spring is coiled around the shaft or plunger and bears at its ends against the follower and the closed end of the case A, as clearly shown in Fig. 3.

D designates a trip-lever, which is pivoted on a shaft or pin, $d$, near one end in the lower portion of one of the inclosing-walls $a$ of the case A, and this lever is arranged across a line drawn through the entrance-holes $a'$ in the case, so that its free end will lie directly in the path of the animal entering the trap through said holes.

The vertically-movable shaft or plunger C is provided with a longitudinal recessed or cut-out portion, $e$, and in this recess is arranged a pivoted arm, E, that is adapted to lie flush therein. To the free end of this arm is securely connected one end of a cord, rope, or other flexible connection, $f$, which, when the trap is set, extends along the connecting-bar $b'$ and over a notch therein down to the pivoted trip-lever D, said lower end of the cord being connected to the middle of a detent, F, the ends of which are adapted to engage a notch, $d'$, in the pivoted end of the trip-lever D and one of the walls of a recess, $d^2$, in one of the walls $a$.

G designates a base board or plate adapted to be detachably connected to the lower open end of the case A, so as to close the same, the base being connected to the case by means of pivoted hooks and eyes, as clearly shown.

H designates a trip-plate, which is provided with two lugs, $h$, which depend therefrom and are pivotally connected to the base by means of a rod, $h'$, having its free ends secured therein. This trip-plate is provided near or at its middle with a longitudinal slot, $i$, in which the free end of the pivoted trip-lever is adapted to fit, the rear end of the said plate having guide flanges or lugs $h^2$, for the reception of the trip-lever, near the pivoted end, while the free or forward end of the trip-plate has arms or fingers J J', that extend above and below the plane of the plate.

The operation of my invention is as follows: When the device is used to entrap or kill moles or other burrowing animals, the base and its attached trip-plate are removed or detached from the case, and the case A is planted or inserted in the ground so that the entrance-openings $a'$ therein are in line with the burrow or passage along which the animal passes. Before planting the trap in the ground, however, the plunger and the spears carried thereby are first elevated by hand against the tension of the spring, and the detent F connected with the notched end of the trip-lever and the recess $d^2$, so as to bring considerable strain or pull on the cord $f$ to retain the arm E and the plunger from retrograde movement. The animal enters the chamber A' of the trap through the entrance-openings $a'$ therein and strikes against the pivoted trip-lever D with sufficient force to elevate the free end of the same, and thereby depress the outer notched end of the trip-lever, which disengages the detent F from the said lever and thereby slackens the tension of the cord $f$ and allows the spring to force the plunger and spears downward with great force, thereby impaling the mole or other animal, or confining it within the chamber A' therein.

When the device is to be used for impaling or entrapping rats, squirrels, and other small animals above the ground, the base G, with its attached trip-plate, is connected to the lower open end of the case A by the hooks and eyes or other preferable means. The free end of the pivoted trip-plate is elevated by hand, and the fingers J thereof are fitted around the free end of the trip-lever D to thereby detachably connect the free ends of the trip-lever and plate together, the detent F being engaged with the outer end of the trip-lever to retain the inner ends of the lever and plate in their elevated position and also exert the necessary strain on the cord $f$ to hold the plunger and spear elevated against the tension of the spring $C^2$. The bait is connected to the trip-lever at an intermediate point of its length, as at $x$, and as the lever is arranged centrally of the trip-plate within or above the slot $i$ thereof, the sides thereof lie at some distance from the lever and bait, so that in order to reach the latter the animal is compelled to tread upon the trip-plate and thereby operate the trap. When the animal treads upon the trip-plate to seize the bait placed on the trip-lever, the free ends of the lever and plate move in opposite directions, and simultaneous with the elevation of the free end of the trip-lever the notched outer end thereof descends and releases the detent F, which thereby slackens the cord $f$ and permits the plunger and spears to descend under the recoil action of the spring $C^2$, thus closing the openings in the case or impaling the animal.

Having thus described my invention, what I claim as new, and desire to secure by Letters Patent, is—

1. The combination, with the trip-lever F of a mole-trap, of a base and a swinging trip-plate arranged above the base and beneath the trip-lever and connected at one end to the said trip-lever, the trip-lever being arranged within the side edges of the trip plate and adapted to carry the bait at an intermediate point of its length, whereby the trap is converted from a mole to a rat trap, substantially as described, for the purpose set forth.

2. The combination, with the trip-lever F of a mole-trap, of a detachable base connected to the trap and carrying a trip-plate which is pivoted at one end upon the base and connected with and elevated at its free end by the said trip-lever, the trip-lever being arranged centrally within the trip-plate and adapted to carry the bait at an intermediate point of its length, as at $x$, substantially as described, for the purpose set forth.

3. The combination, with the trip-lever F of a mole-trap, of a base detachably connected to the trap and a swinging trip-plate pivotally connected at one end with the base and carrying the clamping-fingers at its opposite end to be connected with the free end of the said trip-lever, the trip-lever being arranged centrally within the trip-plate and adapted to carry the bait at an intermediate point of its length, as at $x$, substantially as described, for the purpose set forth.

In testimony that I claim the foregoing as my own I have hereto affixed my signature in presence of two witnesses.

ALWORTH SEWEL.

Witnesses:
 MARK JACKSON,
 THOMAS E. PULLIAM.